(12) United States Patent
Harel et al.

(10) Patent No.: US 7,034,977 B2
(45) Date of Patent: Apr. 25, 2006

(54) AUTOMATIC DC BIAS CONTROL FOR THE DUOBINARY MODULATION FORMAT UTILIZING A LOW-PASS ELECTRICAL FILTER

(75) Inventors: Roey Harel, New Providence, NJ (US); Dean Pappas, Hamilton Square, NJ (US); Gleb Shtengel, Basking Ridge, NJ (US); Jason B. Stark, Holmdel, NJ (US); Donald V. Le Roy, Doylestown, PA (US)

(73) Assignee: Kodeos Communications, South Plainfield, NJ (US)

( * ) Notice: Subject to any disclaimer, the term of this patent is extended or adjusted under 35 U.S.C. 154(b) by 0 days.

(21) Appl. No.: 10/775,054

(22) Filed: Feb. 9, 2004

(65) Prior Publication Data

US 2005/0012976 A1  Jan. 20, 2005

Related U.S. Application Data

(60) Provisional application No. 60/445,604, filed on Feb. 7, 2003.

(51) Int. Cl.
*G02F 1/01* (2006.01)
*G02B 26/00* (2006.01)

(52) U.S. Cl. ...................................................... 359/239

(58) Field of Classification Search ................ 359/239, 359/245, 249, 322; 398/183, 192, 195, 198; 385/2
See application file for complete search history.

(56) References Cited

U.S. PATENT DOCUMENTS

| | | | |
|---|---|---|---|
| 5,400,417 A | 3/1995 | Allie et al. | 385/2 |
| 6,374,000 B1 | 4/2002 | Olesen | 385/2 |
| 6,539,038 B1 | 3/2003 | Wilkerson, Jr. et al. | 372/38.02 |
| 6,556,728 B1 | 4/2003 | Olesen | 385/2 |
| 2002/0003648 A1 | 1/2002 | Kobayashi et al. | 359/180 |
| 2003/0002118 A1* | 1/2003 | Givehchi | 359/181 |
| 2003/0175037 A1* | 9/2003 | Kimmitt et al. | 398/198 |

FOREIGN PATENT DOCUMENTS

EP  1 182 807 A2  2/2002

* cited by examiner

*Primary Examiner*—Scott J. Sugarman
*Assistant Examiner*—Richard Hanig
(74) *Attorney, Agent, or Firm*—Mayer & Williams PC; Stuart H. Mayer, Esq.

(57) ABSTRACT

A method and apparatus is provided for controlling the bias point of a Mach-Zehnder modulator. The method begins by applying a dither signal to a DC bias that is applied to a Mach-Zehnder modulator. A component of an optical output signal provided by the Mach-Zehnder modulator that is synchronous with the dither signal is detected. The dither signal is adjusted to maintain the detected component of the optical output signal at a substantially constant value.

12 Claims, 10 Drawing Sheets

AUTOMATIC DC BIAS CONTROL FOR THE DUOBINARY MODULATION FORMAT UTILIZING A LOW-PASS ELECTRICAL FILTER

STATEMENT OF RELATED APPLICATION

This application claims the benefit of U.S. Provisional Patent Application Ser. No. 60/445,604, filed Feb. 7, 2003, and entitled "Duobinary Automatic Bias Control Circuit," which is incorporated herein in its entirety.

BACKGROUND OF THE INVENTION

Mach-Zehnder modulators achieve amplitude modulation based upon the phase difference between two arms of Mach-Zehnder modulator being proportional to a difference in voltage signals applied to the two arms. The Mach-Zebnder structure allows for this phase modulation to be convened into amplitude modulation. When the input voltage signals are AC-coupled, a DC bias is required in order to set the operating point of the modulator. Due to physical processes in the modulator, the DC bias voltage required for proper operation is time-varying. In order to maintain the proper bias condition, a control circuit is needed that monitors the output of the modulator, and corrects for the time varying bias requirement. For On-Off Keying, such an Automatic Bias Control (ABC) circuit is well-known, and in use in many implementations (see, for example, "Using the Lithium Niobate Modulator: Electro-Optical and Mechanical Connections" *Lucent Technologies Application Note* TN98-004LWP, April 1998.) When advanced line codes are used (see for example commonly owned U.S. Patent Publication No. US-2004-0247324-A1, filed on even date herewith, which is incorporated herein in its entirety), however, the conditions that permit the use of the conventional ABC circuit are not met, and a new, more sophisticated ABC circuit is needed.

Accordingly, it would be desirable to provide a method and apparatus for automatically biasing a class of advanced line codes.

SUMMARY OF THE INVENTION

In accordance with the present invention, a method and apparatus is provided for controlling the bias point of a Mach-Zehnder modulator. The method begins by applying a dither signal to a DC bias that is applied to a Mach-Zehnder modulator. A component of an optical output signal provided by the Mach-Zehnder modulator that is synchronous with the dither signal is detected. The dither signal is adjusted to maintain the detected component of the optical output signal at a substantially constant value.

In accordance with one aspect of the invention, the detecting step includes the step of generating an AC feedback signal.

In accordance with another aspect of the invention, the adjusting step includes the step of demodulating the AC feedback signal to generate a DC error signal.

In accordance with another aspect of the invention, a variable DC offset signal is added to the DC error signal to generate a resulting error signal.

In accordance with another aspect of the invention, the DC error signal is integrated.

In accordance with another aspect of the invention, the resulting error signal is integrated.

DETAILED DESCRIPTION

A duobinary ABC circuit is provided to control the bias point of the MZ modulator. In accordance with the present invention, a dither is applied to the DC bias of the modulator. The frequency of the dither is low, relative to the bit rate of the transmission. Light from the modulator is directed to a detector, where the component of the signal is measured that is synchronous with the dither. Maintaining this signal at a constant level ensures that the bias point of the modulator does not drift over time.

Figure 1:
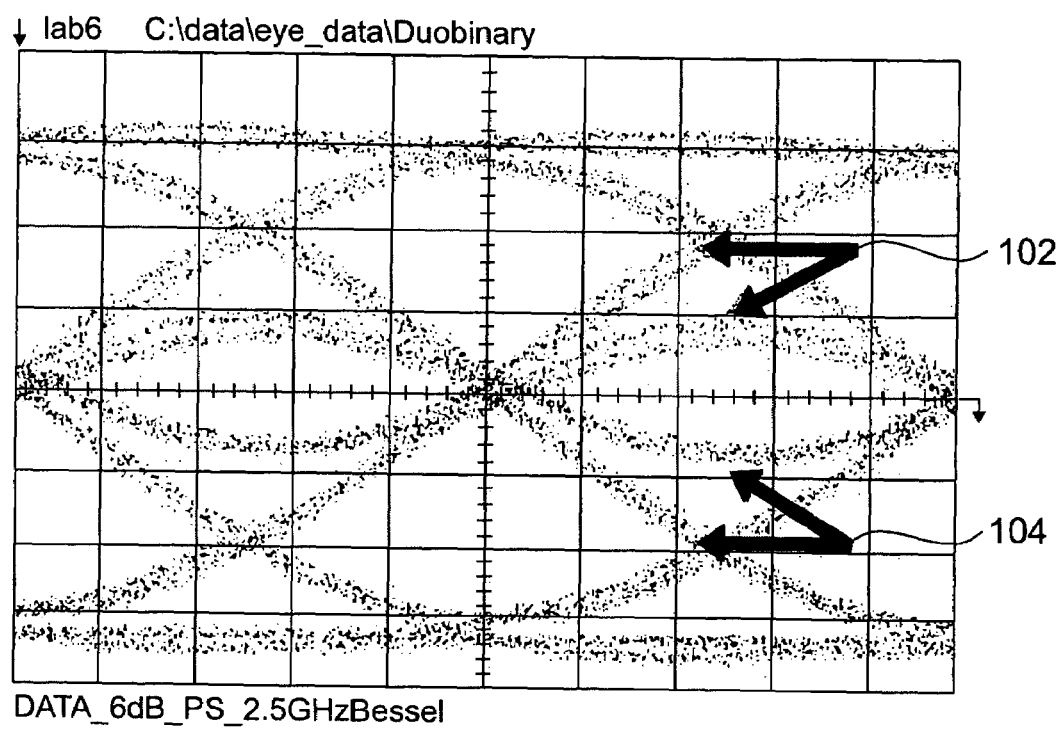
FIG. 1 shows a typical electrical signal at the output of a low-pass electrical filter.

A duobinary modulation format utilizing low-pass electrical filtering of binary electrical signal presents specific set of problems for the automatic bias control of a LiNbO$_3$ modulator. FIG. 1 shows a typical low-pass filtered electrical signal. This signal is converted into a phase difference using the electro-optic effect and then converted into amplitude modulation using a Mach-Zehnder structure. In FIG. 1 the electrical signal is shown at the output of low-pass electrical filter. This signal is symmetric and AC-coupled. This signal may easily depart from ideal symmetry if the filter or the initial binary signal is not ideal. This is the case in FIG. 1 (right), where the rails and transitions are slightly split in the top part of the eye diagram (see arrows 102), but not in the bottom part of the eye diagram (see arrows 104). This asymmetry will be important, as considered below.

A LiNbO$_3$ modulator working in a push-pull mode (x-cut or push-pull drive z-cut) has an electrical field and intensity as following functions of phases and input voltage signal:

$$[\Phi_1(t) - \Phi_2(t)] = \Delta\Phi \propto V(t) \quad (1)$$

$$E_{out} = E_{in}\cos\left(\frac{\Phi_1(t) - \Phi_2(t)}{2}\right) \text{ and}$$

$$I_{out} = I_{in}\cos^2\left(\frac{\Phi_1(t) - \Phi_2(t)}{2}\right),$$

Figure 2:
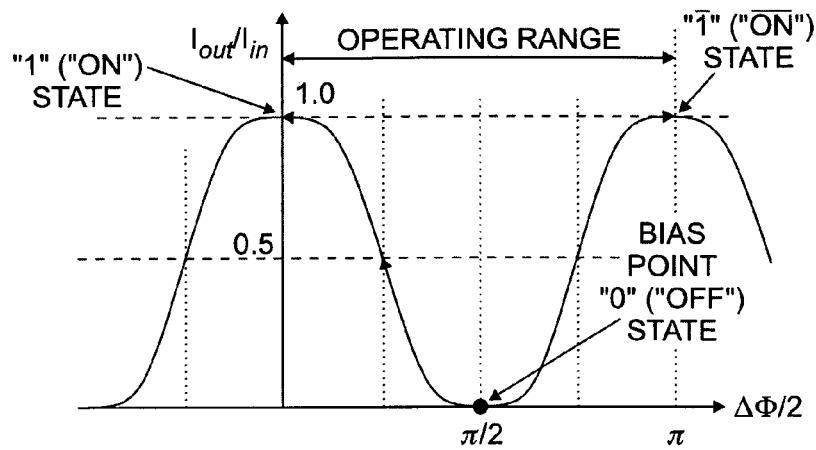
FIG. 2 shows the output intensity as a function of input electrical signal (phase difference in LiNbO$_3$ modulator working in a push-pull mode).
Figure 2:
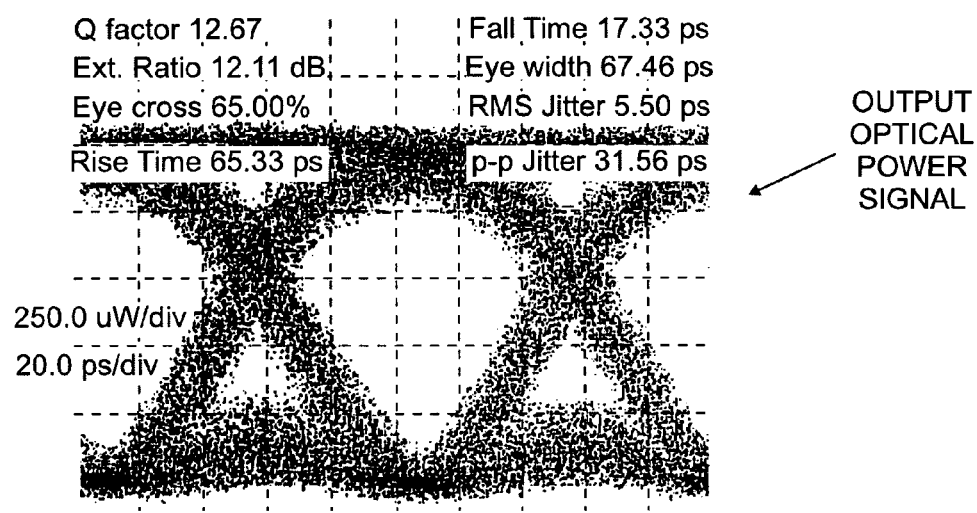
Figure 2:
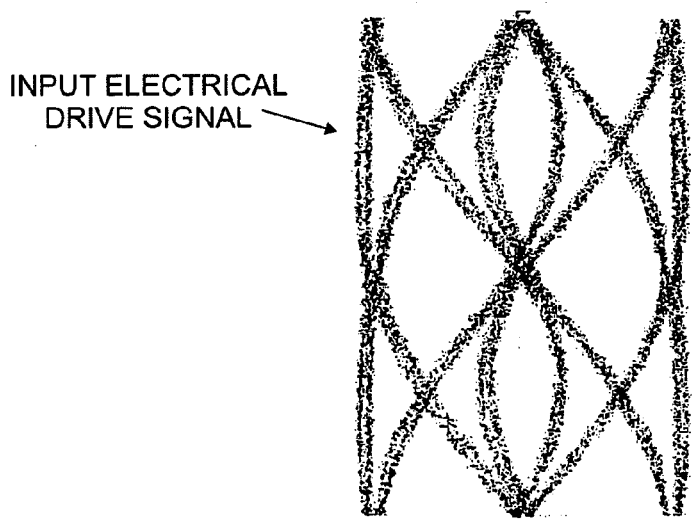

Duobinary operation relies on a three-level electrical field signal, as illustrated in FIG. 2.

As can be seen from FIG. 2, the DC Bias for an AC-coupled Duobinary electrical signal should be chosen at "zero" or OFF state.

The present inventors have developed a numerical model in Labview 6.0 using standard routines for electrical filters and an idealized push-pull LiNbO$_3$ modulator model using Equations 1. In this model, initial binary electrical pulses (from the amplifier output) with trapezoidal pulse shape (equal rise and fall times of 30 ps) were passed through 4$^{th}$ or 5$^{th}$ order low-pass Bessel filter. A value for the low-pass Bessel filter cut-off frequency in Labview was selected which would produce reasonably looking electrical and optical eye-diagrams. This electrical waveform was applied to the electrodes of an x-cut LiNbO$_3$ modulator (Equations 1). Then the average optical power was calculated as function of DC bias. For the DC bias dither, the error signal is then just a derivative of the average signal vs. DC Bias.

Figure 3:
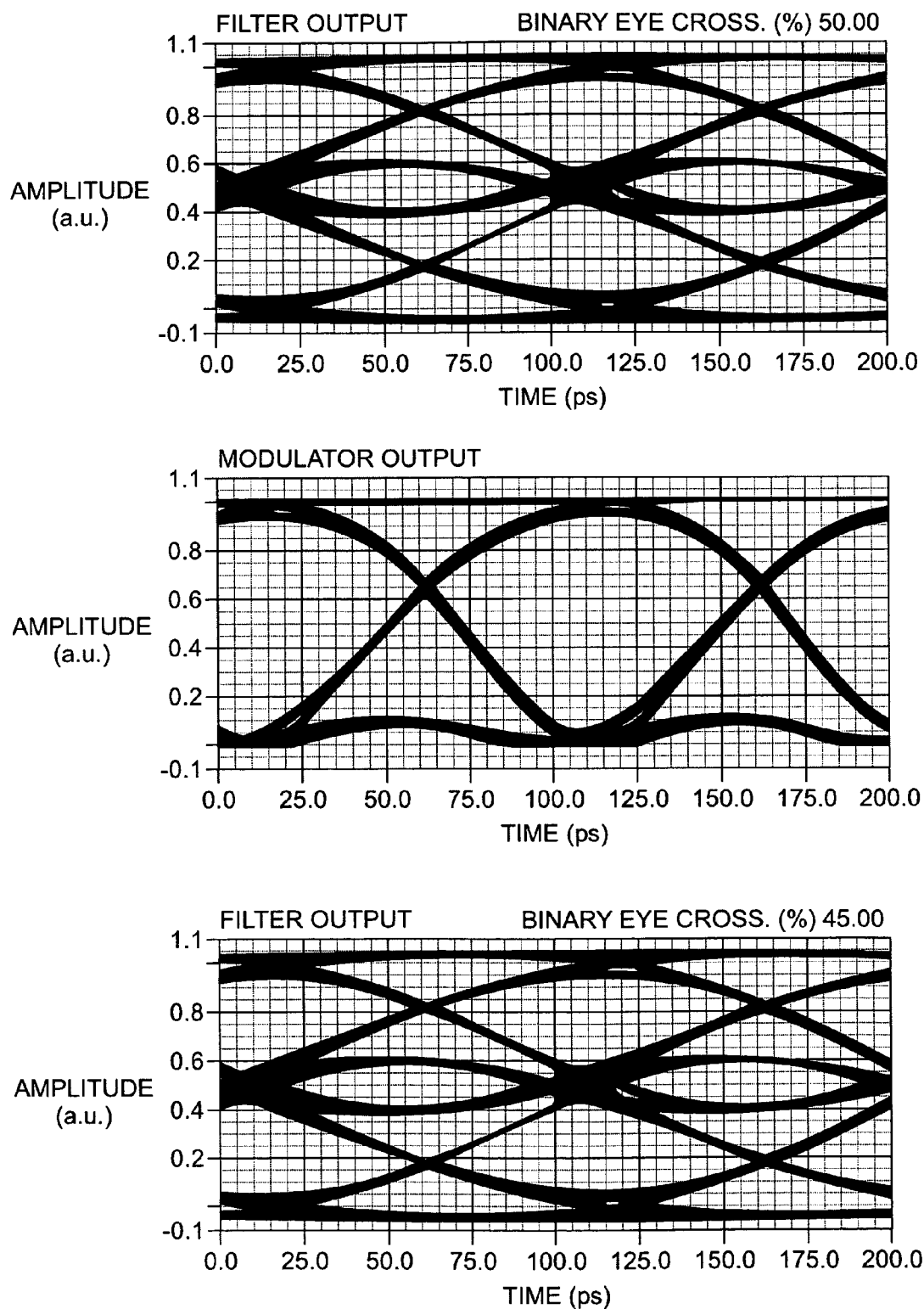
FIG. 3 shows the modeled eye-diagrams of the electrical drive signal (upper curves) and the modulator optical output signal (lower curves) for an ideal input binary signal with 50% eye crossing (leftmost curves) and 45% eye crossing (rightmost curves).
Figure 3:
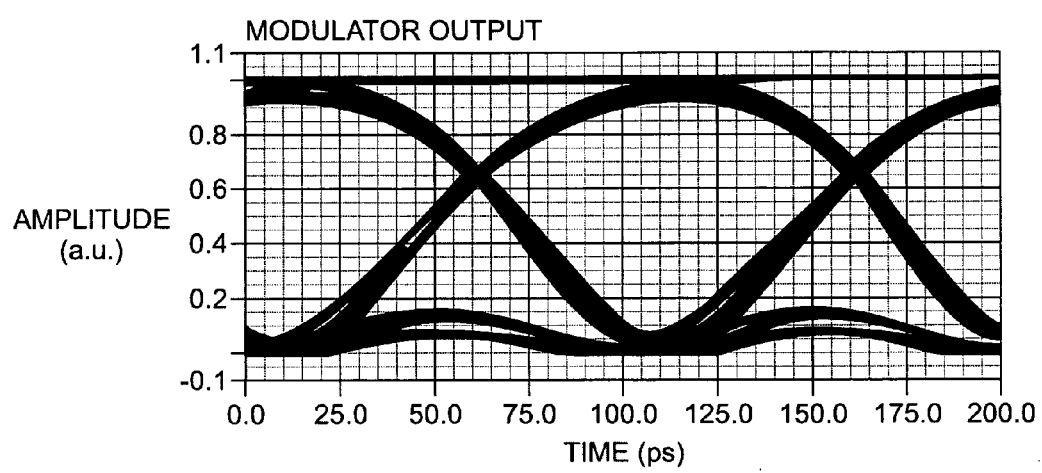

FIG. 3 shows the modeled eye-diagrams of electrical drive signal (upper diagrams) and modulator optical output signal (lower diagrams) for an ideal input binary signal with 50% eye crossing (leftmost diagrams) and 45% eye crossing (rightmost diagrams). The case with binary eye-crossing of 45% is shown to emphasize the importance of a high degree of symmetry in the initial electrical signal. With a small drop in eye-crossing value of the initial binary electrical signal, the duobinary electrical signal also changes slightly, and this results in a noticeable change in resulting optical signal. It is expected that if the DC bias is dithered in this configuration the response (if any) will also critically depend on the input binary signal symmetry.

Figure 4:
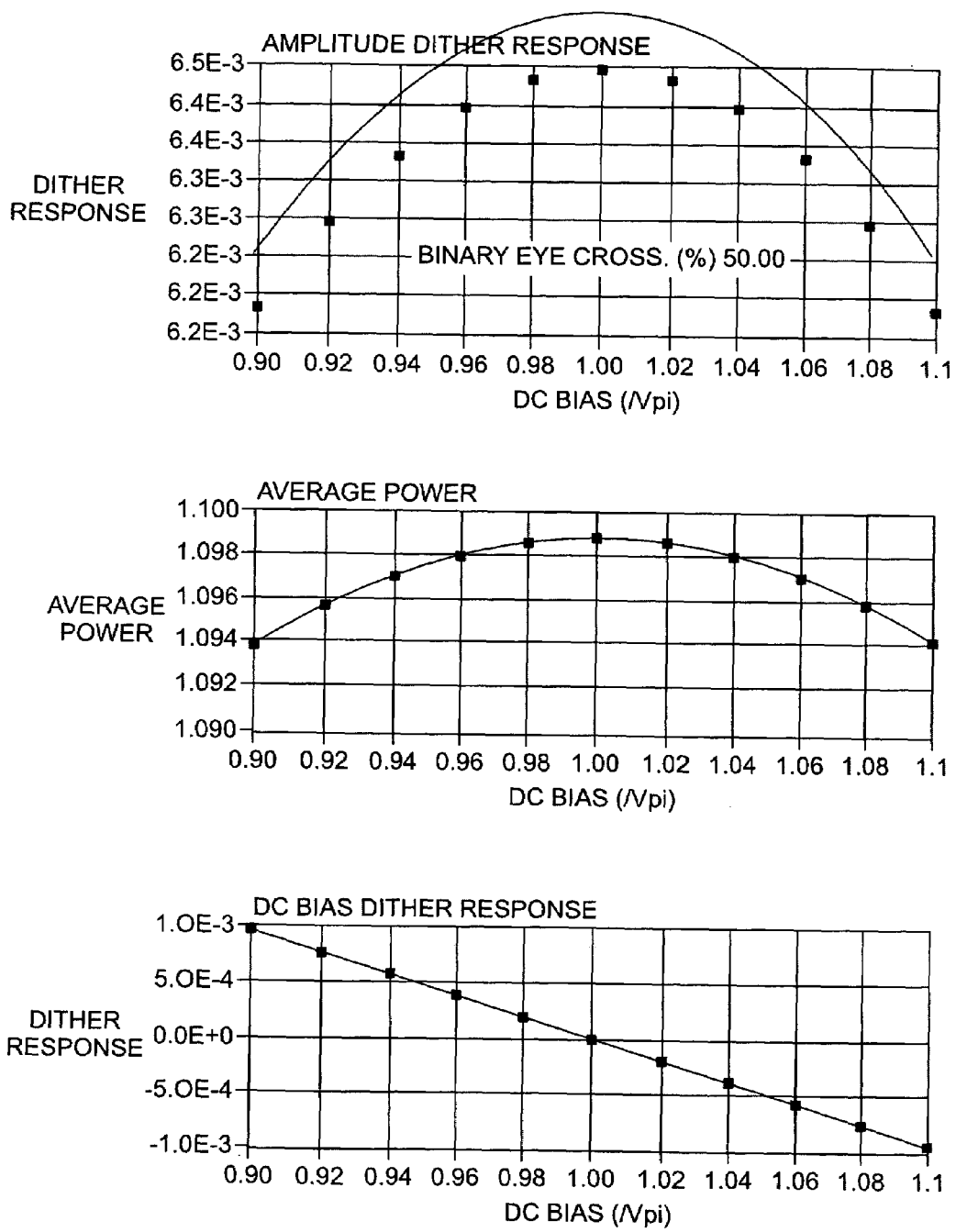
FIG. 4 shows the average optical power, and average optical power response to dither of binary signal amplitude and DC bias with an initial binary eye crossing of 50% (leftmost curves) and 45% (rightmost curves).
Figure 4:
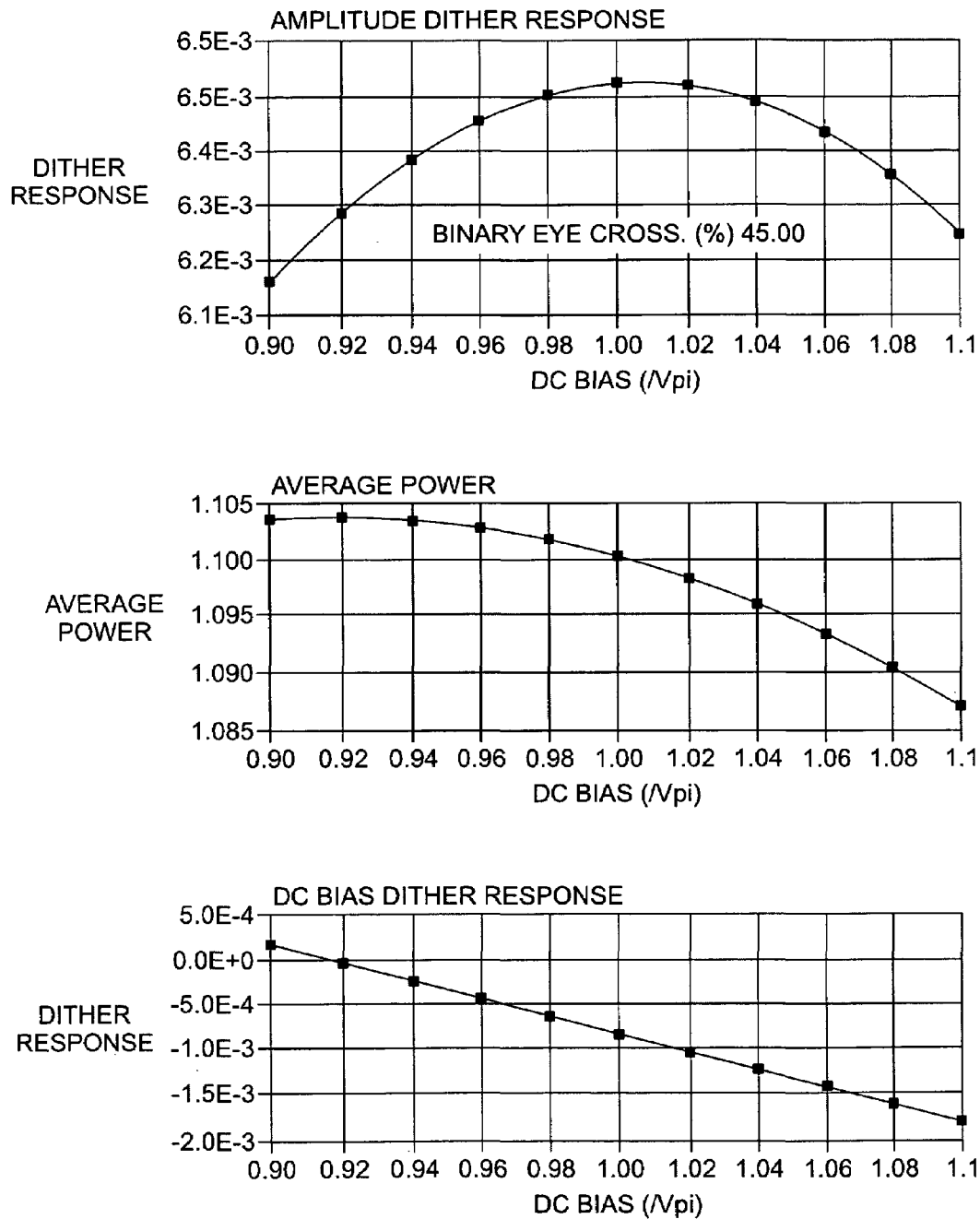

FIG. 4 shows the average optical power, the average optical power response to dither of binary signal amplitude, and DC bias for two cases that correspond to two of the cases in FIG. 3. As can be seen in FIG. 4, the optical power is a maximum at optimal DC bias (V$\pi$) and drops symmetrically as the DC bias departs from optimal. This means that the DC bias dither will produce a signal that could be used for ABC operation. The problem is that if the symmetry of the initial binary signal is broken, the erroneous offset will be introduced into the feedback signal, resulting in DC bias error. A binary signal amplitude dither, as seen in the uppermost curves in FIG. 4, is a quadratic function of the DC bias offset, so it cannot be directly used for ABC feedback. Its second harmonic can be used however, and it seems more robust to symmetry removal.

In additional to the aforementioned numerical results, experiments were performed where the DC Bias on a LiNbO$_3$ modulator was dithered with a small-signal sinusoidal waveform (frequency 1 kHz, amplitude 0.025V). The in-phase voltage response on the terminals of p-I-n monitor photodiode at the output of the modulator was measured using standard lock-in amplifier. This response amplitude was measured as a function of DC bias along with the eye-diagram of the optical signal at the modulator output. The properties of this eye-diagram and the amplitude of the response vs. Dc bias are plotted in FIG. 5.

Figure 5:
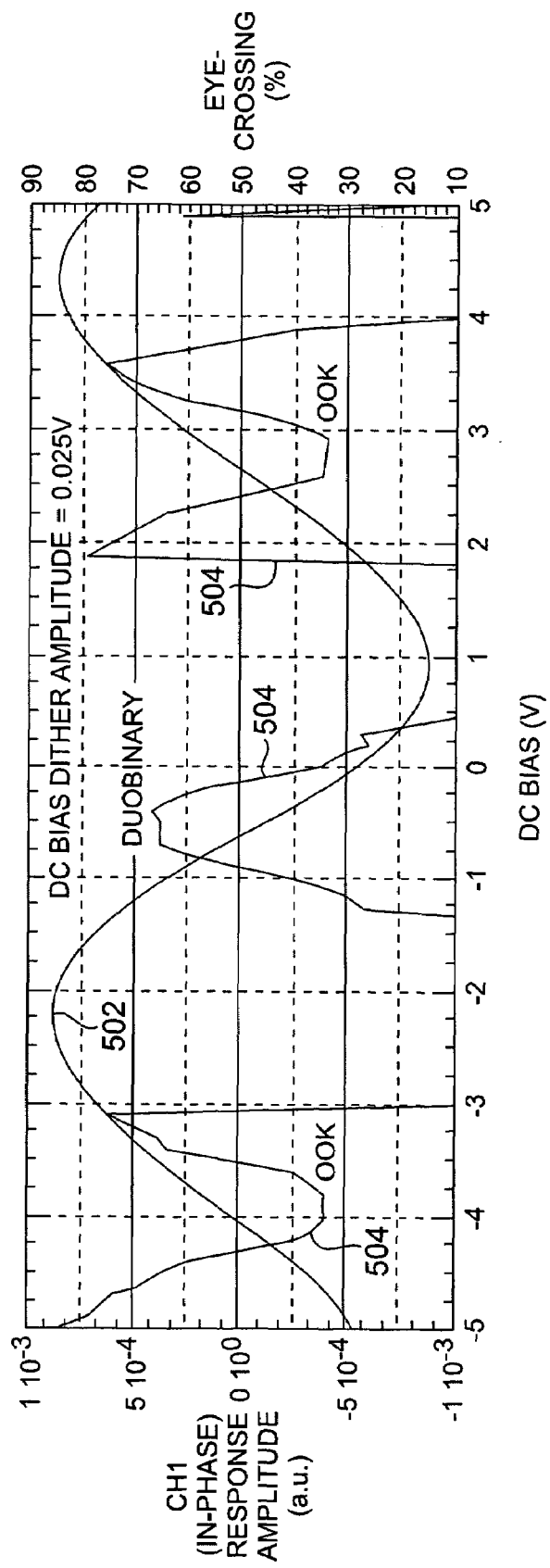
FIG. 5 shows the average optical power response to DC bias dither as a function of DC Bias (curves 502), and important eye parameters, such as eye-crossing (curves 504), extinction ratio (curve 506), and Q-factor (curve 508).
Figure 5:
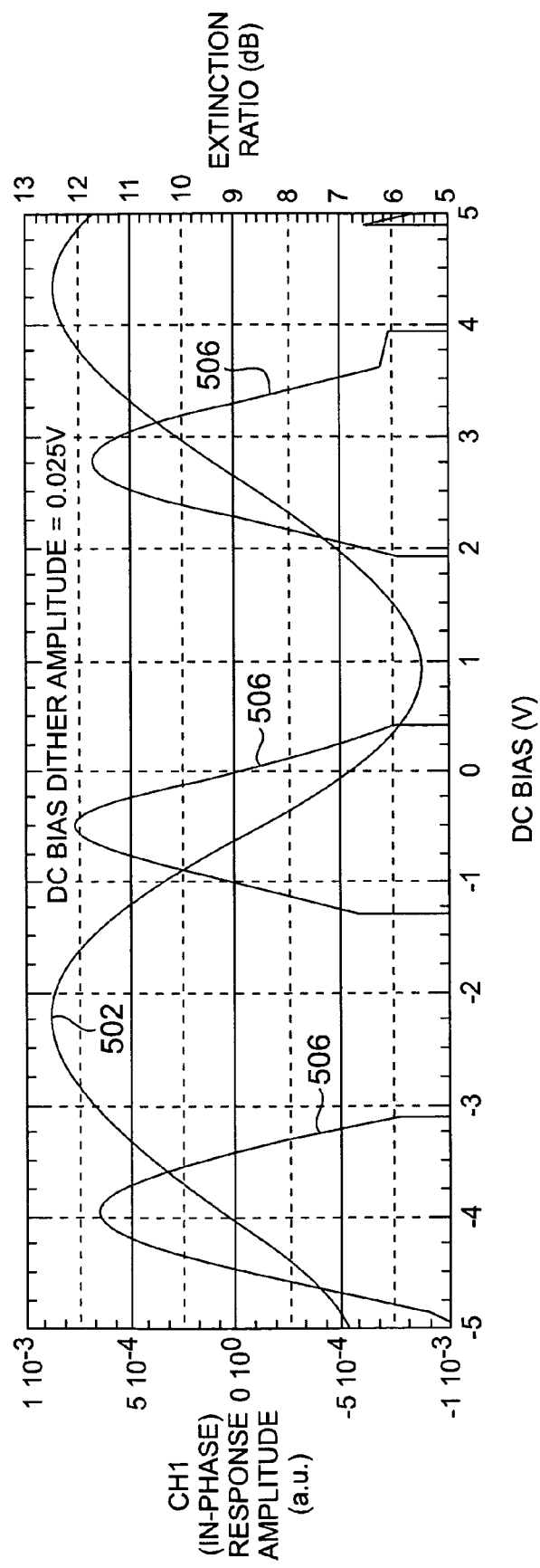
Figure 5:
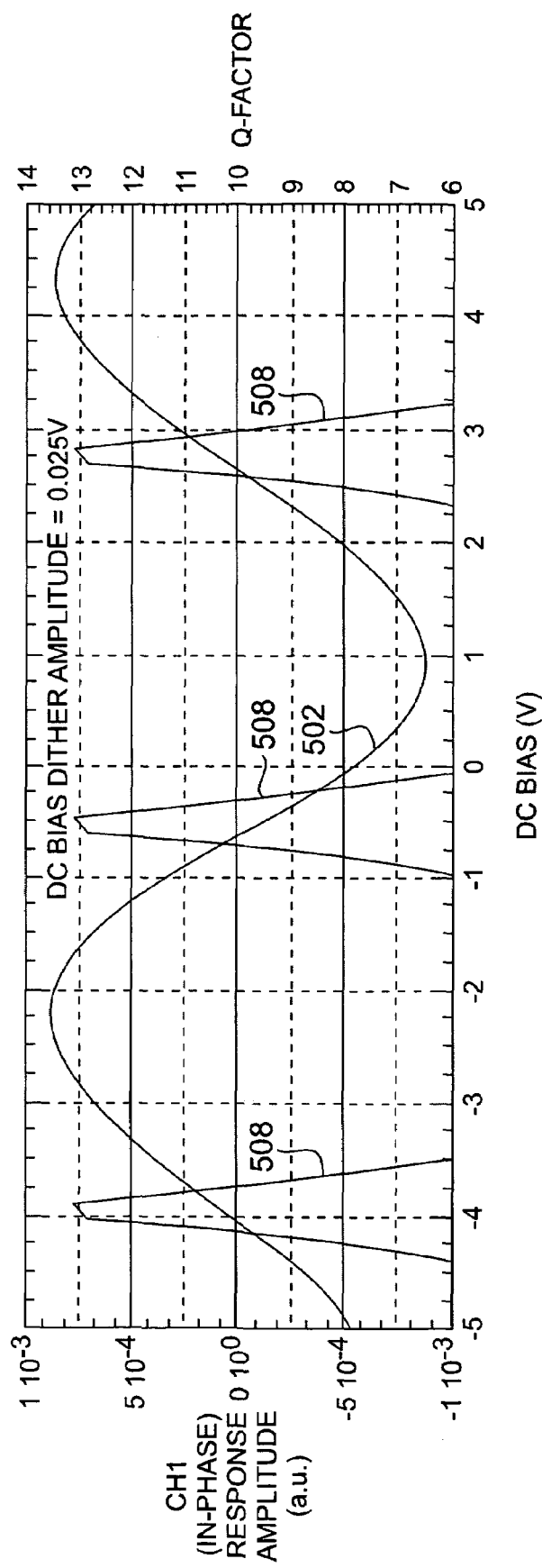

As predicted, the optical power response to DC bias dither as a function of DC Bias (curves 502) can be used as a feedback signal for the ABC circuit (see FIG. 5). Also as predicted, by varying the input binary signal, an error was able to be introduced into this feedback signal.

Figure 6:
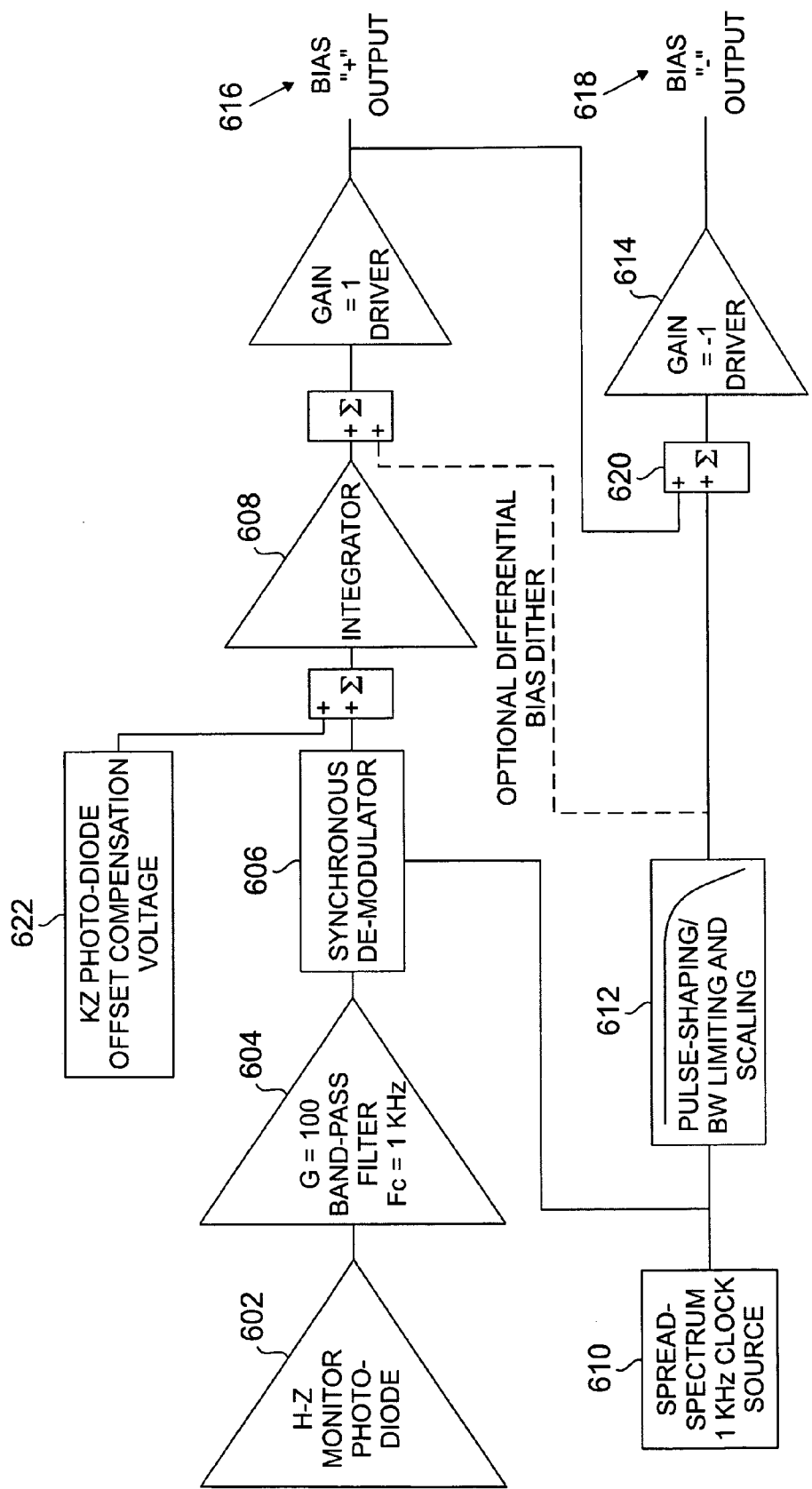
FIG. 6 shows on embodiment of an ABC circuit for a duo-binary transmitter constructed in accordance with the principles of the present invention.

FIG. 6 shows one embodiment of an ABC circuit in accordance with the present invention. When the Mach-Zehnder bias is "dithered" by applying a small AC voltage, either to one of the bias/RF terminals, or differentially to both terminals, an AC feedback or error signal is generated by photodetector 602: superimposed on the signal sensed at the Mach-Zehnder photo-diode output. The diagram illustrates the difference between the two BIAS-Dither injection methods with dotted lines. This AC voltage varies both in amplitude and phase, in response to the magnitude and direction of the error in Mach-Zehnder bias, from the optimal. This error signal is relatively small, as compared to both the noise at the photo-detector, and the low-frequency content of the wide-band RF signal. This necessitates both gain and narrow-band filtering by filter 604, in order to recover the AC signal. The filtered and amplified signal is demodulated by demodulator 606, synchronously with the spread-spectrum source 610 that generates the dither. The resulting DC error term is integrated by integrator 608, buffered, and applied to one terminal of the Mach-Zehnder modulator. This is the "+" or positive BIAS terminal 616. That signal is inverted, in sense, by inverter 614 buffered, and applied to the "−" or negative BIAS terminal 618 of the Mach-Zehnder modulator. This creates a differential BIAS drive with no DC content. The AC BIAS-Dither signal, which is summed by adder 620 with the BIAS output, is a spectrally limited version of the original spread-spectrum source, which may be derived from a pulse shaper and scaler 612, which may be embodied in hardware, or software, or a combination thereof.

The AC error signal, which is subsequently demodulated and integrated, is subject to errors due to the construction of the Mach-Zehnder modulator. Ideally the AC error signal passes through a null at the optimal bias voltage; this null often occurs at a point that differs from the optimal BIAS by a fraction of Vpi. This error is often inconsequential in ON-OFF-Key transmission, although correction may yield improvements in optical extinction ratio, in OOK systems. Due to the optical "folding" of the filtered electrical eye, Duo-Binary transmission requires that this error be corrected, in order to maintain the integrity of the optical "0" rail. As shown in the diagram, a stable but variable DC signal generated by offset voltage compensator 622 is summed with the output of the demodulator 606. This produces a new BIAS point: displaced from the original error signal null, by a fixed portion of Vpi.

What is claimed is:

1. A method for controlling the bias point of a Mach-Zehnder modulator, said method comprising the steps of:
    applying a dither signal to a DC bias that is applied to a Mach-Zehnder modulator;
    detecting a component of an optical output signal provided by the Mach-Zehnder modulator that is synchronous with the dither signal; and
    adjusting the dither signal to maintain the detected component of the optical output signal at a substantially constant value.

2. The method of claim 1 wherein the detecting step includes the step of generating an AC feedback signal.

3. The method of claim 2 wherein the adjusting step includes the step of demodulating the AC feedback signal to generate a DC error signal.

4. The method of claim 3 further comprising the step of adding a variable DC offset signal to the DC error signal to generate a resulting error signal.

5. The method of claim 3 further comprising the step of integrating the DC error signal.

6. The method of claim 4 further comprising the step of integrating the resulting error signal.

7. An apparatus for controlling the bias point of a Mach-Zehnder modulator, comprising:
    means for applying a dither signal to a DC bias that is applied to a Mach-Zehnder modulator;
    means for detecting a component of an optical output signal provided by the Mach-Zehnder modulator that is synchronous with the dither signal; and means for adjusting the dither signal to maintain the detected component of the optical output signal at a substantially constant value.

8. The apparatus of claim 7 wherein the detecting means comprises a photodetector generating an AC feedback signal and a gain and narrow-band filter filtering the AC feedback signal.

9. The apparatus of claim 7 wherein the applying means comprises means for generating the dither signal.

10. The apparatus of claim 9 wherein the dither signal generating means comprises a spread-spectrum source.

11. The apparatus of claim 8 wherein the adjusting means includes a synchronous demodulator for demodulating the AC feedback signal received from the gain and narrow-band filter to generate an error signal and an integrator for integrating the error signal.

12. The apparatus of claim 11 further comprising an offset voltage compensator for adding a variable DC offset signal to the error signal.

* * * * *

UNITED STATES PATENT AND TRADEMARK OFFICE
CERTIFICATE OF CORRECTION

PATENT NO. : 7,034,977 B2  Page 1 of 1
APPLICATION NO. : 10/775054
DATED : April 25, 2006
INVENTOR(S) : Roey Harel et al.

It is certified that error appears in the above-identified patent and that said Letters Patent is hereby corrected as shown below:

Specification, Col. 1, line 19, change first word "Zebnder" to -- Zehnder --.

Specification, Col. 1, line 20, change first word "convened" to -- converted --.

Specification, Col. 2, line 21, after "shows" change "on" to -- an --.

Specification, Col. 2, line 53, after first word "as" insert -- the --.

Specification, Col. 3, line 9 after "produce" change "reasonably" to -- reasonable --.

Specification, Col. 3, line 12, after "as" insert -- a --.

Specification, Col. 3, line 43, after "in" change "additional" -- addition --.

Specification, Col. 4, line 13, after "in" insert -- a --.

Signed and Sealed this

Twenty-sixth Day of September, 2006

JON W. DUDAS
*Director of the United States Patent and Trademark Office*